US011074379B2

(12) United States Patent
Reddy et al.

(10) Patent No.: US 11,074,379 B2
(45) Date of Patent: Jul. 27, 2021

(54) MULTI-CYCLE LATCH TREE SYNTHESIS

(71) Applicant: International Business Machines Corporation, Armonk, NY (US)

(72) Inventors: Lakshmi N. Reddy, Mount Kisco, NY (US); Gustavo Enrique Tellez, Essex Junction, VT (US); Paul G. Villarrubia, Austin, TX (US); Christopher Joseph Berry, Hudson, NY (US); Michael Hemsley Wood, Wilmington, DE (US); Robert A. Philhower, Valley Cottage, NY (US); Gi-Joon Nam, Chappaqua, NY (US); Jinwook Jung, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 16/370,948

(22) Filed: Mar. 30, 2019

(65) Prior Publication Data

US 2020/0311221 A1    Oct. 1, 2020

(51) Int. Cl.
*G06F 30/30* (2020.01)
*G06F 30/39* (2020.01)
*G06F 111/04* (2020.01)
*G06F 111/20* (2020.01)
*G06F 119/12* (2020.01)

(52) U.S. Cl.
CPC ............. *G06F 30/30* (2020.01); *G06F 30/39* (2020.01); *G06F 2111/04* (2020.01); *G06F 2111/20* (2020.01); *G06F 2119/12* (2020.01)

(58) Field of Classification Search
CPC ...... G06F 30/30; G06F 30/39; G06F 2111/04; G06F 2111/20; G06F 2119/12
See application file for complete search history.

(56) References Cited

U.S. PATENT DOCUMENTS

| 6,434,704 | B1 | 8/2002  | Dean et al.  |
| 6,920,625 | B2 | 7/2005  | Gass         |
| 8,001,502 | B2 | 8/2011  | Chang        |
| 8,341,569 | B2 | 12/2012 | Zhang et al. |

(Continued)

OTHER PUBLICATIONS

Peyer et al., unpublished U.S. Appl. No. 16/237,995, filed Jan. 2, 2019, Construction of Staging Trees on Fully Hierarchical VLSI Circuit Designs, pp. 1-24 plus 7 sheets of drawings.

(Continued)

*Primary Examiner* — Jack Chiang
*Assistant Examiner* — Aric Lin
(74) *Attorney, Agent, or Firm* — Erik Johnson; Otterstedt, Wallace & Kammer, LLP

(57) ABSTRACT

For each of a plurality of source-sink pairs, a corresponding interconnect layer is selected having a reach length which permits propagation of a required signal within a required sink cycle delay. For a first clock cycle, a movable region for a first latch is located as a first plurality of overlapped regions one reach length from a source and the required sink cycle delay number of reach lengths from each one of the sinks; and the first plurality of overlapped regions is represented as nodes on a first cycle level of a topology search graph. Analogous actions are carried out for a second clock cycle of the required sink cycle delay. A latch tree is created based on the topology search graph, wherein a required number of latches is minimized, and at each of the cycle levels, all sinks of source nodes selected at a previous level are covered.

20 Claims, 10 Drawing Sheets

(56) References Cited

U.S. PATENT DOCUMENTS

| | | | |
|---|---|---|---|
| 8,495,552 | B1 | 7/2013 | Cho et al. |
| 8,555,227 | B2 | 10/2013 | Mallem et al. |
| 9,098,669 | B1 | 8/2015 | Alpert et al. |
| 9,477,104 | B2 | 10/2016 | Liu |
| 9,881,687 | B2 | 1/2018 | Qiu et al. |
| 2014/0156891 | A1 | 6/2014 | Alfieri |
| 2016/0140005 | A1 | 5/2016 | Kim et al. |
| 2017/0004164 | A1 | 1/2017 | Tucek et al. |
| 2017/0132347 | A1 | 5/2017 | Kalafala et al. |

OTHER PUBLICATIONS

Li et al.; "Statistical Timing Analysis for Latch-Controlled Circuits with Reduced Iterations and Graph Transformations" TCAD IEEE Transactions on, vol. 31, Issue 11, Nov. 2012, pp. 1670-1683.

Yuan et al.; "Statistical Timing Verification for Transparently Latched Circuits through Structural Graph Traversal", ASP-DAC IEEE 15th Inter. Conf. on, Jan. 18-21, 2010, pp. 663-668 (presentation slides 1-30).

Papa et al.; "RUMBLE: An Incremental, Timing-Driven, Physical-Synthesis Optimization Algorithm", TCAD IEEE Transactions on, vol. 27, Issue 12, Dec. 2008, pp. 2156-2168.

Ward et al.;"Clock Power Minimization Using Structural Latch Templates and Decision Tree Induction", ICCAD IEEE/ACM Inter. Cont. on, Nov. 18-21, 2013, pp. 599-606.

Jeon J, Kim D, Shin D, Choi K. High-level synthesis under multi-cycle interconnect delay. InProceedings of the 2001 Asia and South Pacific Design Automation Conference Jan. 30, 2001 (p. 662). ACM pp. 1-6.

Mullins R, West A, Moore S. The design and implementation of a low-latency on-chip network. InProceedings of the 2006 Asia and South Pacific Design Automation Conference Jan. 24, 2006 (pp. 164-169). IEEE Press.

Cong J, Fan Y, Yang X, Zhang Z. Architecture and synthesis for multi-cycle communication. InProceedings of the 2003 international symposium on Physical design Apr. 6, 2003 (pp. 190-196). ACM.

Rim M, Jain R, De Leone R. Optimal allocation and binding in high-level synthesis. In[1992] Proceedings 29th ACM/IEEE Design Automation Conference Jun. 8, 1992 (pp. 120-123). IEEE.

Daniel D. Gajski et al., High—Level Synthesis: Introduction to Chip and System Design. Springer Science & Business Media, Dec. 6, 2012, 1-page excerpt on https://books.google.com/books/about/High_Level_Synthesis.html?id=1BTaBwAAQBAJ.

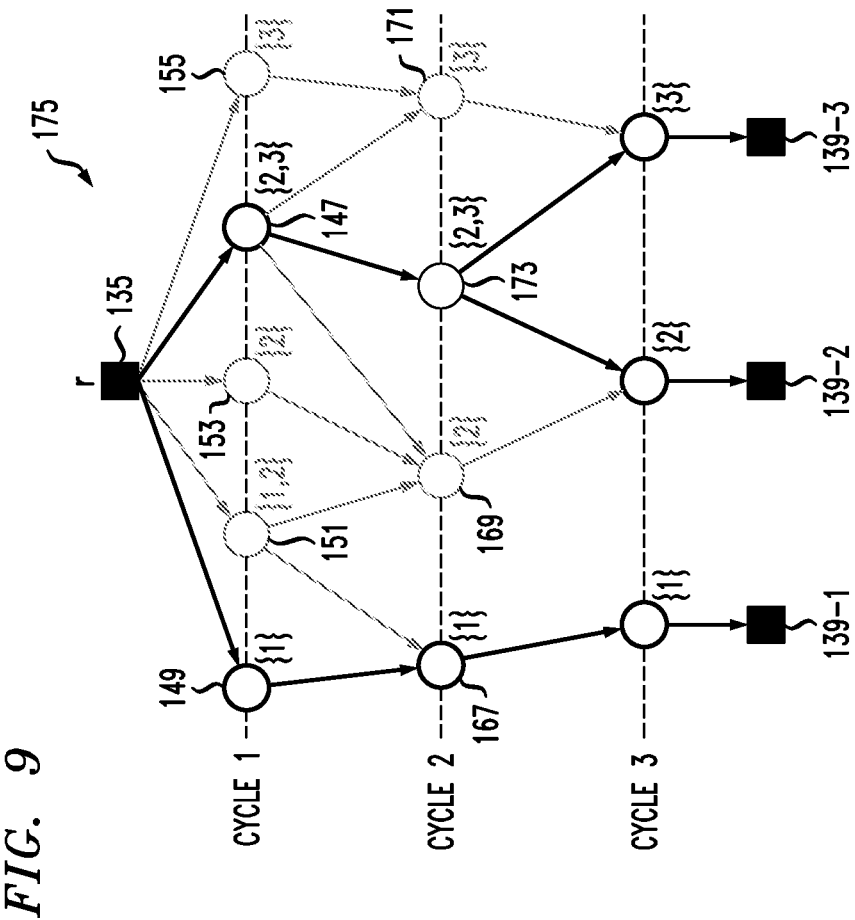
FIG. 9
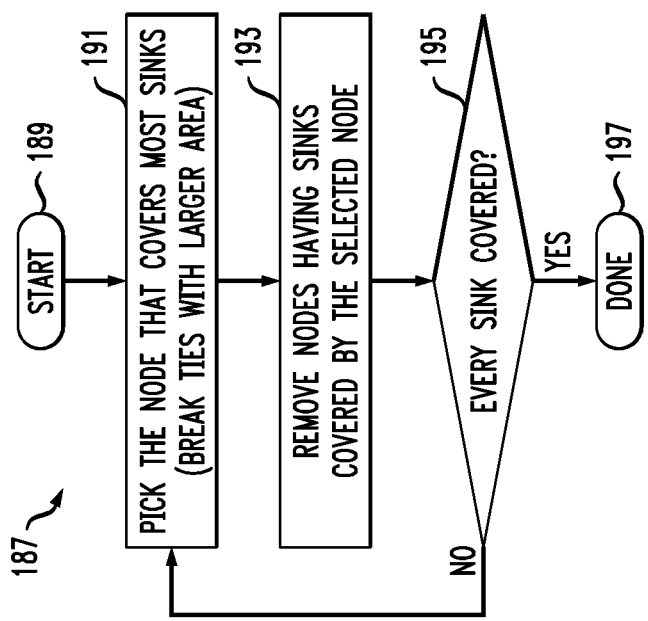

MULTI-CYCLE LATCH TREE SYNTHESIS

BACKGROUND

The present invention relates to the electrical, electronic, and computer arts, and more specifically, to semiconductor Electronic Design Automation (EDA) and the like.

EDA involves the use of software tools for designing electronic systems such as integrated circuits and printed circuit boards. In large VLSI (Very Large Scale Integration) circuit designs, a problem arises wherein signals need to travel a long distance between two points, but cannot traverse the distance between the two points in a single clock cycle.

SUMMARY

Principles of the invention provide techniques for multi-cycle latch tree synthesis. In one aspect, an exemplary method for increasing the efficiency of electronic design automation includes obtaining an input specification including: (i) locations, in a putative integrated circuit design, for a source and a plurality of sinks, including a plurality of source-sink pairs, wherein the sinks are located such that a required signal cannot propagate from the source in a single clock cycle, the sinks each having a required sink cycle delay requiring latching; and (ii) a set of layer traits for interconnect layers available in the putative integrated circuit design. The method further includes selecting, from the set of layer traits, for each of the source-sink pairs, a corresponding one of the interconnect layers having a reach length which permits propagation of the required signal within the required sink cycle delay; for a first clock cycle of the required sink cycle delay, locating a movable region for a first latch as a first plurality of overlapped regions one reach length from the source and the required sink cycle delay number of reach lengths from each one of the sinks; for the first clock cycle, representing the first plurality of overlapped regions as nodes on a first cycle level of a topology search graph; for a second clock cycle of the required sink cycle delay, locating a movable region for a second latch as a second plurality of overlapped regions two reach lengths from the source and the required sink cycle delay number of reach lengths, less one, from each one of the sinks; for the second clock cycle, representing the second plurality of overlapped regions as nodes on a second cycle level of the topology search graph; and creating a latch tree, based on the topology search graph, wherein one or more of the nodes are selected at each of the cycle levels, a required number of the latches is minimized, and at each of the cycle levels, all given ones of the plurality of sinks of those of the nodes selected at a previous level are covered.

In another aspect, an exemplary computer includes a memory; and at least one processor, coupled to the memory, and operative to obtain an input specification including: (i) locations, in a putative integrated circuit design, for a source and a plurality of sinks, including a plurality of source-sink pairs, wherein the sinks are located such that a required signal cannot propagate from the source in a single clock cycle, the sinks each having a required sink cycle delay requiring latching; and (ii) a set of layer traits for interconnect layers available in the putative integrated circuit design. The at least one processor is further operative to select, from the set of layer traits, for each of the source-sink pairs, a corresponding one of the interconnect layers having a reach length which permits propagation of the required signal within the required sink cycle delay; for a first clock cycle of the required sink cycle delay, locate a movable region for a first latch as a first plurality of overlapped regions one reach length from the source and the required sink cycle delay number of reach lengths from each one of the sinks; for the first clock cycle, represent the first plurality of overlapped regions as nodes on a first cycle level of a topology search graph; for a second clock cycle of the required sink cycle delay, locate a movable region for a second latch as a second plurality of overlapped regions two reach lengths from the source and the required sink cycle delay number of reach lengths, less one, from each one of the sinks; for the second clock cycle, represent the second plurality of overlapped regions as nodes on a second cycle level of the topology search graph; and create a latch tree, based on the topology search graph, wherein one or more of the nodes are selected at each of the cycle levels, a required number of the latches is minimized, and at each of the cycle levels, all given ones of the plurality of sinks of those of the nodes selected at a previous level are covered.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

reducing the number of latches needed in an integrated circuit (IC) design;

increasing the power efficiency and/or timing efficiency of multi-cycle latch trees, thereby enhancing the performance of integrated circuits using the latch trees;

improving the technological process of EDA by automating latch tree synthesis to reduce the time expended in circuit design;

reducing the number of latches may help improve routing congestion as well: (i) it reduces the number of connections to distribute the multi-cycle signal, and so fewer routing resources will be used for signal routing; (ii) clock signal distribution will also use fewer routing resources due to the reduced number of clock sinks (sequencing elements such as latches); (iii) in addition, latches and sequencing elements typically occupy more routing resources within the standard cells; reducing the number of sequencing elements hence makes more routing resources available for routers.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 8 and 9 illustrates aspects of a greedy heuristic used in latch tree creation, in accordance with one or more embodiments;

DETAILED DESCRIPTION

Figure 1:
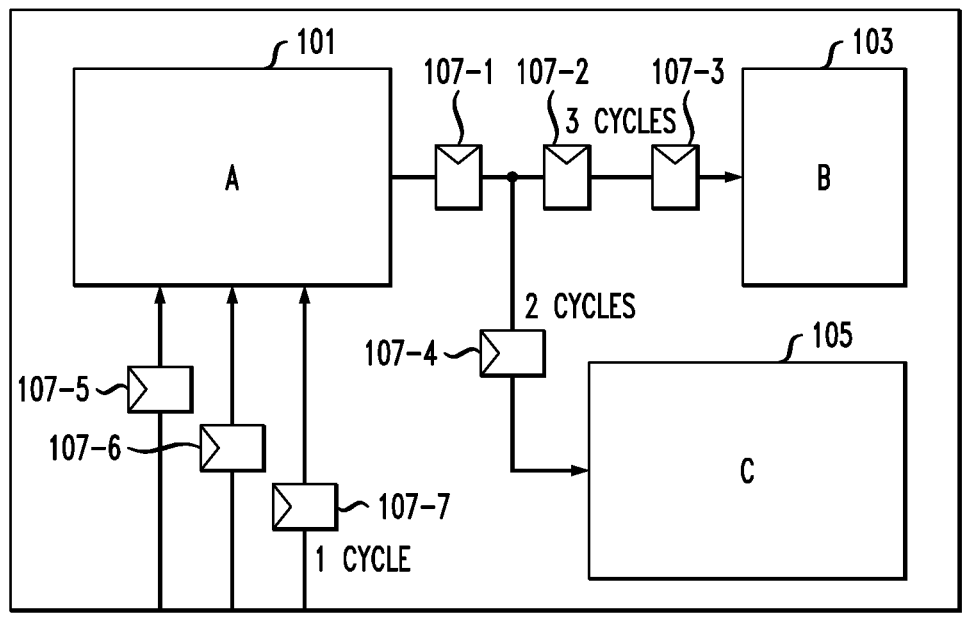
FIG. 1 illustrates multi-cycle wires within a circuit, the design of which can be analyzed and enhanced in accordance with one or more embodiments.

One or more embodiments address a problem which arises in large VLSI designs; namely, there are some signals which must travel very long distances. That is to say, some wires come with cycle-delay constraints after design and there is a need to synthesize the wires & satisfy the given constraints. Refer to FIG. 1, which depicts a hierarchical circuit design including lower level components A, B, and C, numbered, respectively, 101, 103, and 105. The components may actually be quite detailed inside but can be abstracted as blocks for illustrative purposes. There are signals that must travel, e.g., from A to B or from A to C, if the design is to function properly. The exemplary design is a synchronous or clocked design wherein signals must typically travel within a clock cycle. The small flag-like boxes 107-1 through 107-7 represent sequencing elements, e.g., latches, flip-flops or registers. The signals travel within a clock cycle and are latched. In the next clock cycle, they launch out of the latch and try to travel as far as possible in the next clock cycle; then, if they have not reached their destinations, they are again latched.

There is the constraint that the signals can only travel a certain distance within a clock cycle. The circuit designer will specify that a certain signal needs to travel from A to B within a certain number of clock cycles. The number of cycles shown in FIG. 1 refers to the number of latches in the middle of the starting and ending points; e.g., the number of hops between A and B (in the non-limiting example of FIG. 1, three cycles between A and B; two cycles between A and C, and one cycle on the inputs to A). There are actually four clock cycles between A and B however; the starting source A to the first latch 107-1; the first latch 107-1 to the second latch 107-2; the second latch 107-2 to the third latch 107-3; and the third latch 107-3 to block B. In some instances, the starting source and/or the ending source may not be on a latch boundary so there may not be a full cycle between A and the first latch and/or the final latch and B. However, this can be ignored for purposes of simplification. Thus, the notation "3 cycles" in FIG. 1 means that the signal traverses three latches from A to B and may take up to four actual clock cycles.

In the non-limiting example of FIG. 1, the first latch 107-1 on the path from A to B is also the first latch on the path from A to C; it is shared by the two paths. Sharing is desirable (i.e. using as few latches as possible), as long as the design constraints are met (signal travels from A to B in specified number of cycles, not more and not less).

One or more embodiments address the Multi-Cycle Latch Tree Synthesis Problem; i.e., creation of latch trees for nets having cycle-delay constraints. The designer will specify, for example, the number of cycles/latches in the path; the root net/driver, the source, and the cycle delay constraints for each sink. Building the tree requires knowing, for example, permissible types of latches and permissible types of layer trait(s) that can be used to build the wires. Regarding the layer traits, the signal typically needs to be routed from the source to the sink (e.g. from A to B or from A to C). The routing can be done at various routing layers. Higher routing layers imply that the signal can travel faster, or, in a given clock cycle, the signal can cover more distance than at the lower routing layer(s). However, high-level resources are precious, since the higher the routing layer is, the less the amount of routing resource(s) that is/are available. So, the designer will typically specify what routing layers can be used (higher layers may be reserved, for example, for high-priority use; on the other hand, if routing layers of a very low level are specified, the timing constraints may not be able to be met). Once it is known what layers can be used, it is known how much distance can be covered by the signal in each clock cycle. This helps in proper planning and building of the latch tree.

In one or more embodiments, the appropriate input information includes the initial placement; i.e., initial coordinates of sources (e.g. A) and sinks (e.g. B and C), as well as any blockages and already-placed cells. A goal in one or more embodiments is to build a feasible multi-cycle latch tree that will honor all the sink cycle constraints (e.g. number of latches for each path A to B, A to C, and so on). One or more embodiments have the optimization goal of accomplishing the design of the tree using as few latches as possible (i.e. minimizing number of latches created/used), so as to optimize the power and area. Further, when it is determined to put a latch in particular location, it is typically necessary to verify that the location is legal; e.g. that the latch in that location is not overlapping something else. Some embodiments may optionally omit determination of legality. One or more embodiments also seek to optimize timing; i.e., within the clock cycle constraints, it is desired to get from the source to the sink as soon as possible. One or more embodiments are congestion neutral. Advantageously, one or more embodiments build the multi-cycle tree in a manner that does not significantly increase design routing congestion, or do so in a congestion-aware fashion. For example, this may mean avoiding placement of latches in dense or already congested areas of the design. As will be appreciated by the skilled artisan, given the teachings herein, routing is a subsequent step where nets in the design are assigned to metal layers. Changes made in accordance with aspects of the invention may have significant effect on this later step in some cases.

Thus, one or more embodiments create latch trees for a set of nets which have multi-cycle timing constraints. The givens include cycle delay constraints for each multi-cycle net, which defines the launching time at the driver and the required capturing time at each sink, as well as layer traits and placement information.

The problem can be stated more formally as follows:
The input includes:

A source r, and a set of sinks $S=\{s_1, s_2, \ldots, s_n\}$; as well as the locations of the source and sinks (each sink $s_i$ has a required sink cycle delay of $c_i$)

A set of layer traits, each of which is associated with the name of the routing layer and the cycle reach length (how far the signal can travel in a single cycle within the routing layer).

The output includes a staging latch tree from source r to sinks S with all the respective required sink cycle delays of sinks satisfied.

In one or more embodiments, a first step includes, from a library of layer traits provided by the designer, selecting an appropriate layer trait and reach length R (how far the signal can travel in a single cycle) that it is desired to use to build the latch tree, from a layer trait reach table (virtual timing environment). Note that since there are many available solutions, it is desirable to have a data structure that can capture all the available solutions. Thus, one or more embodiments generate a topology search graph $G=(V,E)$ using R, discussed further below. Then, an attempt is made to pick an optimal solution (latch tree with minimal number of latches). Finally, use the results to create an actual latch tree.

Figure 2:
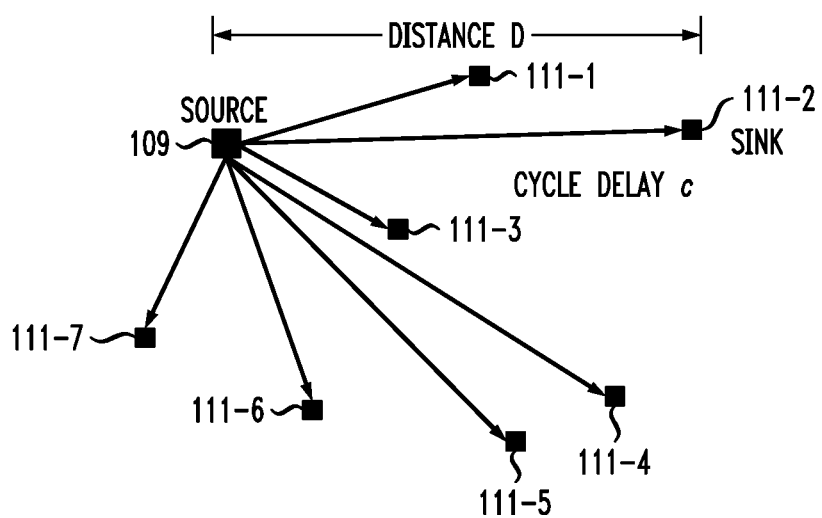
FIG. 2 illustrates aspects of cycle reach length selection, in accordance with one or more embodiments.

Regarding the first step, cycle reach length selection, refer now to FIG. 2. Note the source 109 and a plurality of sinks 111-1 through 111-7. For each source-sink pair, compute the distance D. Divide the computed distance D by the required sink cycle delay c (the latter specified by the designer) to calculate the shortest feasible reach for that sink. For a given sink, it will thus be known what distance needs to be traveled every clock cycle. In one or more embodiments this is repeated for all the sinks 111-1 through 111-7 (in this example), and then the maximum of all computed shortest feasible reach values is picked. That is to say, over all the source/sink pairs, compute the shortest feasible reach r.

Formally, given a sink $s_i$, its shortest feasible reach $r_i$ from the source is given by $r_i=D/c_i$, where D is the distance from the source to $s_i$, and $c_i$ is the required sink cycle delay associated with $s_i$. The shortest feasible reach of the target latch tree, denoted by r, is then given by $r=\max\{r_1, r_2, \ldots, r_n\}$, where n is the number of sinks. Note that, in this context, the "shortest feasible reach" is from the point of view of the layer trait library as opposed to the point of view of the sinks. Each sink has a different feasible reach. It is desired to pick a layer trait that meets the maximum feasible reach noted over all the sinks.

From the reach table, choose the layer trait with cycle reach length R that is longer than r.

Thus, return to the library knowing that a layer trait is required that permits traveling at least that distance (r) in one clock cycle, in order to obtain a feasible multi-cycle tree. In one or more embodiments, the library of layer traits is organized in such a way that it includes the characteristics of the layer traits and the reach lengths (how much distance R can be traveled in one clock cycle). The number is looked up and a layer trait with reach length greater than that the shortest feasible reach (i.e. R>r) is selected (may be slightly more or much more, depending on what is available in the library). In one or more embodiments, pick the lowest layer trait with reach length greater than what is required (for example, suppose there are six layer traits one through six with one the highest, and one through four have adequate reach length; pick four since it is the lowest layer trait with adequate reach length). The reach length of that layer trait is R.

Now consider the next step in one or more embodiments; namely, topology search graph generation. It is desired to determine where a latch can be placed in the tree in order to satisfy constraints. Refer to the example in FIG. 3, wherein there is only one source 113 (which is typical) but also only one sink 115 (for purposes of simplicity). For illustrating the potential movable region of a latch, FIG. 3 assumes a 2-pin net whose cycle delay is 3. An exemplary requirement of the sink 115 is that the path from source 113 to sink 115 needs to go through three latches 117-1, 117-2, 117-3 for a total of four cycles. It is desired to build a tree; it will accordingly have three levels of latches. The first level latch 117-1 has two constraints: (i) it needs to be less than one reach length 1R from the source 113, since, when the signal leaves the source, it needs to get to the first level latch in one clock cycle; and (ii) it needs to be within three clock cycles/three reach lengths 3R from the sink 115. Any latch that can be placed in a region that is 1R away from the source and 3R away from the sink is feasible and can serve as the first-level latch.

Figure 3:
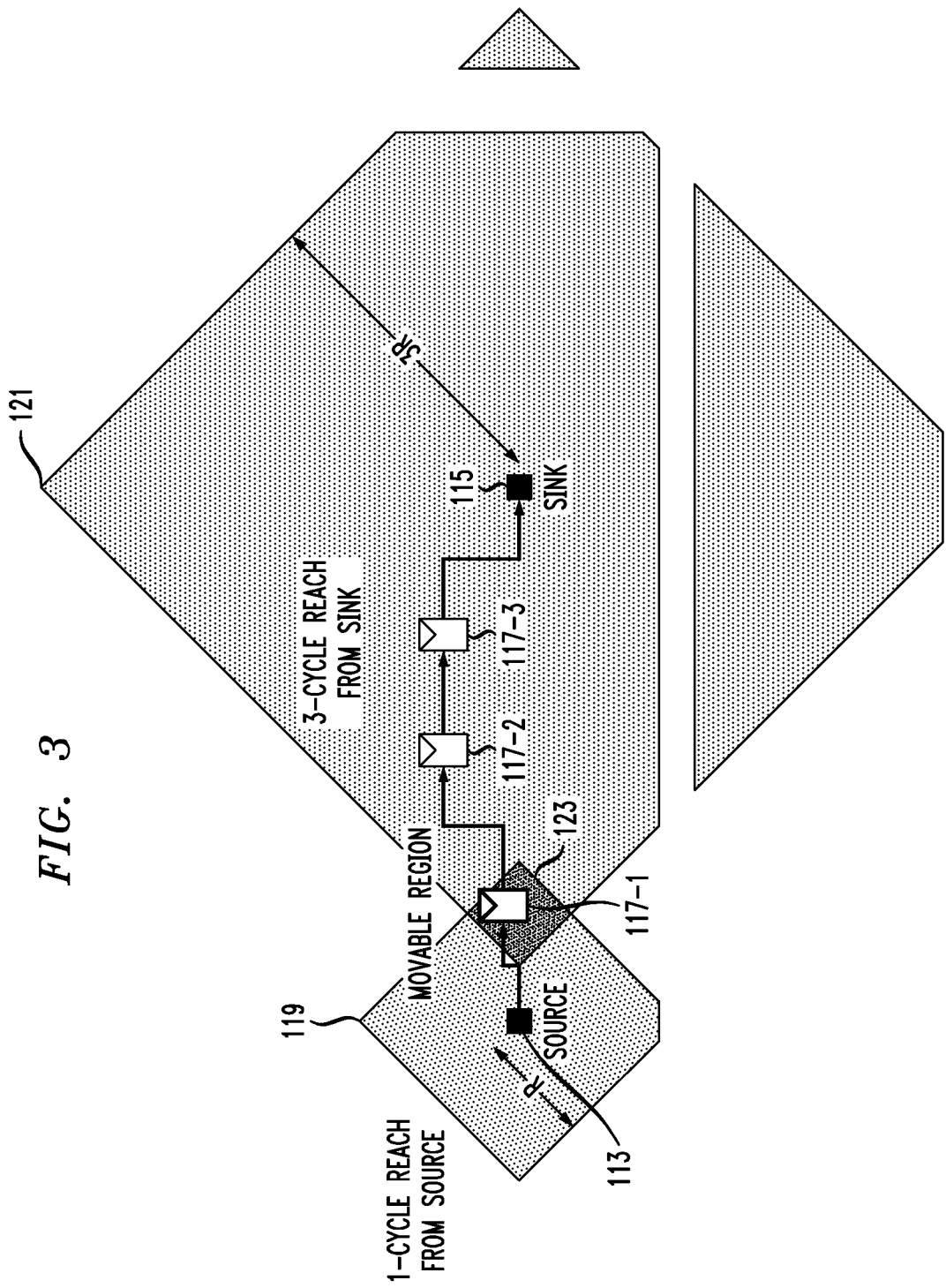
FIG. 3 illustrates aspects of a potential movable region of a latch, in accordance with one or more embodiments.

It should be mentioned at this point that modern VLSI routing typically employs a technique called "Manhattan Routing" after the well-known midtown Manhattan street grid with avenues running north-south and orthogonal streets running east-west. In FIG. 3, when it is stated that a latch must be within one reach length of the source, the feasible area is represented as a so-called "Manhattan Diamond" (first shaded area 119), which is the collection of all points having the same Manhattan distance from the source; Manhattan distance of two points $(x_i, y_i)$ and $(x_j, y_j)$ is given by $|x_i-x_j|+|y_i-y_j|$. Similarly, for the sink 115, the larger shaded diamond 121 is within three reach lengths in Manhattan distance. The intersecting region 123 shows the feasible latch location(s) for the first latch 117-1. There should be at least one overlapped region where the latch can be placed; otherwise, the design is not feasible. The overlapped area determines the movable region (MR) for latches.

Thus, for the algorithm for latch tree generation, assume that the given is a net having two pins, and also assume that its cycle delay constraint is set to three. Now, suppose it is desired to place the latch 117-1. The region in which the latch can be placed can be determined as follows. In terms of the source 113, the latch 117-1 is one cycle ahead, so draw a diamond shape 119 with one cycle reach. From the sink 115, the latch 117-1 is three cycles behind, so draw a diamond shape 121 with three cycle reach. Then, the two diamond shapes 119, 121 create an overlapped region 123, and this region determines where the latch can be placed.

Figure 4:
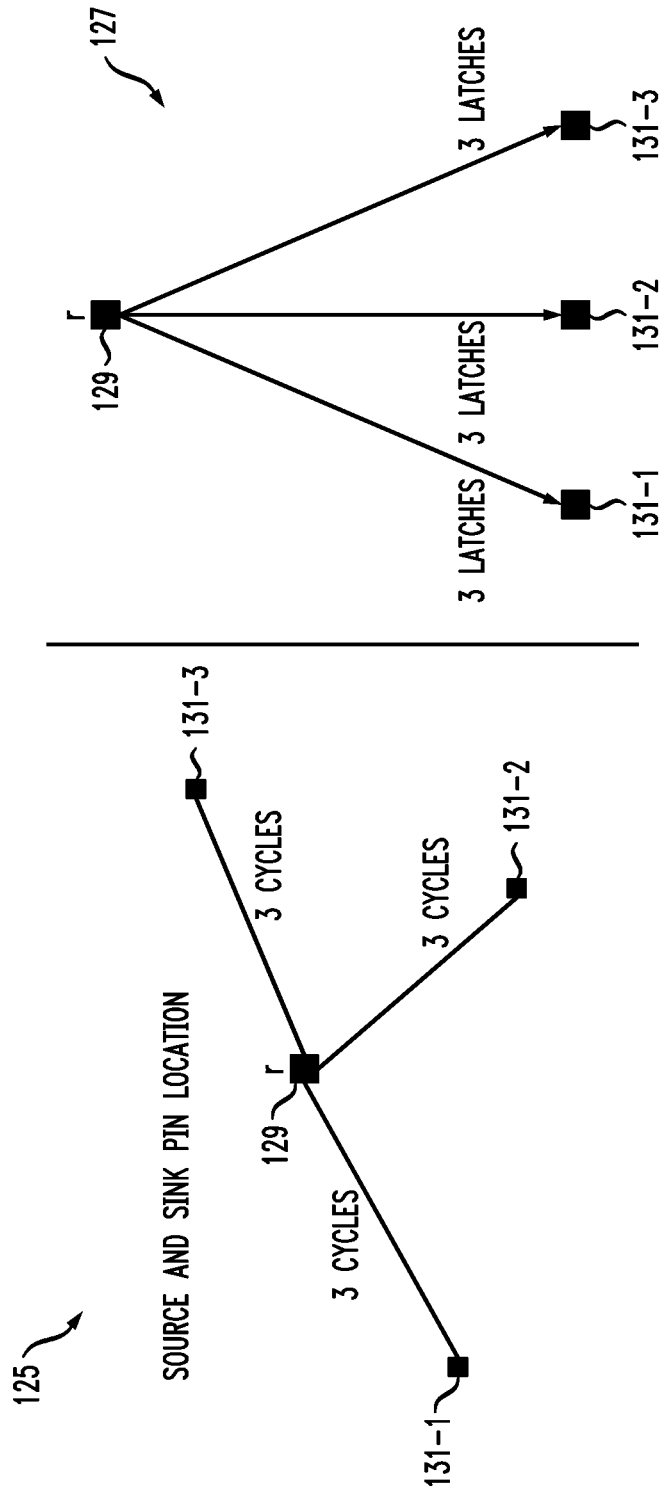
FIG. 4 illustrates topology search graph generation, in accordance with one or more embodiments.
Figure 5:
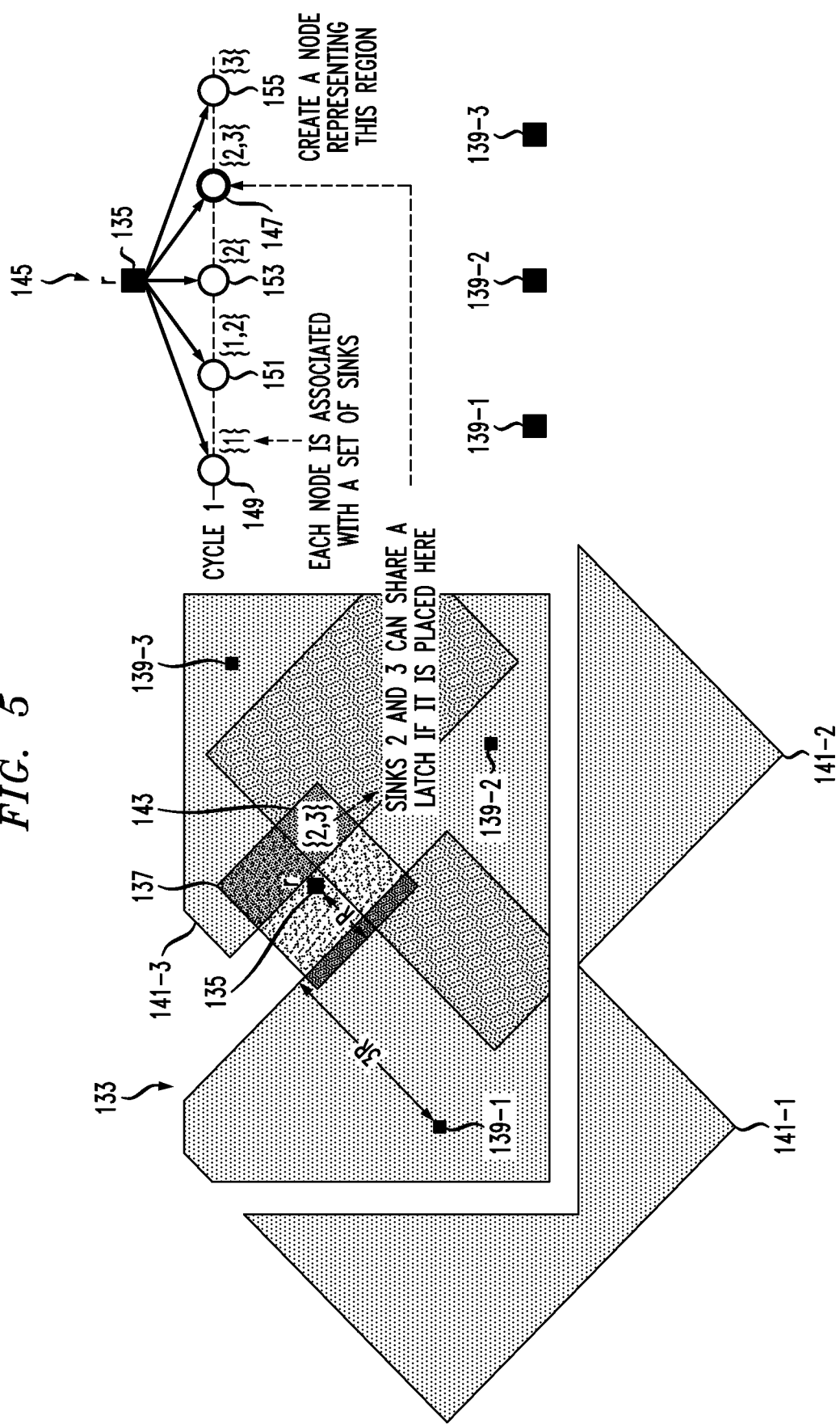
FIG. 5 illustrates finding movable regions (latches for a first cycle), in accordance with one or more embodiments.

Refer to an exemplary multi-cycle net 125, and its logical abstract representation 127 in FIG. 4. In this case, there are one source (root) 129 and three sinks 131-1, 131-2, and 131-3 (source and sink pin locations). Each sink needs the signal to go through three latches/four cycles. Thus, the cycle delay constraint is three for every sink, with cycle reach length R. Refer to FIG. 5, and note at 133 on the left-hand side the placement of the first level latch. The root is at 135 and any first level latch has to be within one reach length of the root (diamond 137 radius 1R). For each of the three sinks 139-1, 139-2, and 139-3, the requirement is four three latches/four cycles, so a Manhattan Diamond is constructed from each sink with radius equal to three (three large diamonds 141-1, 141-2, 141-3 radius 3R). Consider the region 143 where the diamonds 141-2, 141-3 for sinks two and three overlap with the diamond 137; if a latch is placed here, it can be shared, thus saving one latch. It is not yet known whether it is desirable to take advantage of this option at this stage; however, it is desirable to capture this information for later decision-making. One or more embodiments create a data structure called a topology search graph, as depicted at 145 on the right-hand side of FIG. 5. Nodes are created for each identified movable region. The information of interest is captured as the highlighted node 147 at cycle 1/level 1. The highlighted circle/node 147 represents a candidate latch and its location; if selected, it will be located at level one and drive sinks 2 and 3 ("{2,3}").

One or more embodiments repeat the analysis for all overlaps; at the cycle 1 level, there are other nodes 149, 151, 153, 155. For example, the first node 149 indicates it would just drive sink 1 ("{1}"). The second node 151 indicates it would eventually drive sinks 1 and 2 ("{1,2}"). The third node 153 indicates it would just drive sink 2 ("{2}"). The last node 155 indicates it would just drive sink 3 ("{3}"). The process can be continued for level 2/cycle 2 and level 3/cycle 3 to complete the graph, capturing the available options in the data structure.

Thus in FIG. 5, find potential movable regions for latches cycle by cycle, by drawing diamond shapes from source and sink. Find the movable regions for latches which is one cycle ahead from the source, in other words, latches for cycle 1. Draw a diamond 137 at the source using the selected cycle reach length R, and three diamonds 141-1, 141-2, 141-3 from sinks 139-1, 139-2, 139-3 using the radius of 3R. Notice that one cycle ahead from the source means three cycles behind from the sinks, so draw diamond shapes from the sinks using 3R. Those diamond shapes create overlapped region, where latches can be placed. Accordingly, identify the overlapped region, and create vertices representing each of the overlaps. By identifying all the unique intersections created by diamonds, the locations where latches can be placed are visualized. Note that the terminology "draw" is used in a figurative sense and does not imply pencil-and-paper drawing but rather determination of the locations by the EDA software.

Figure 6:
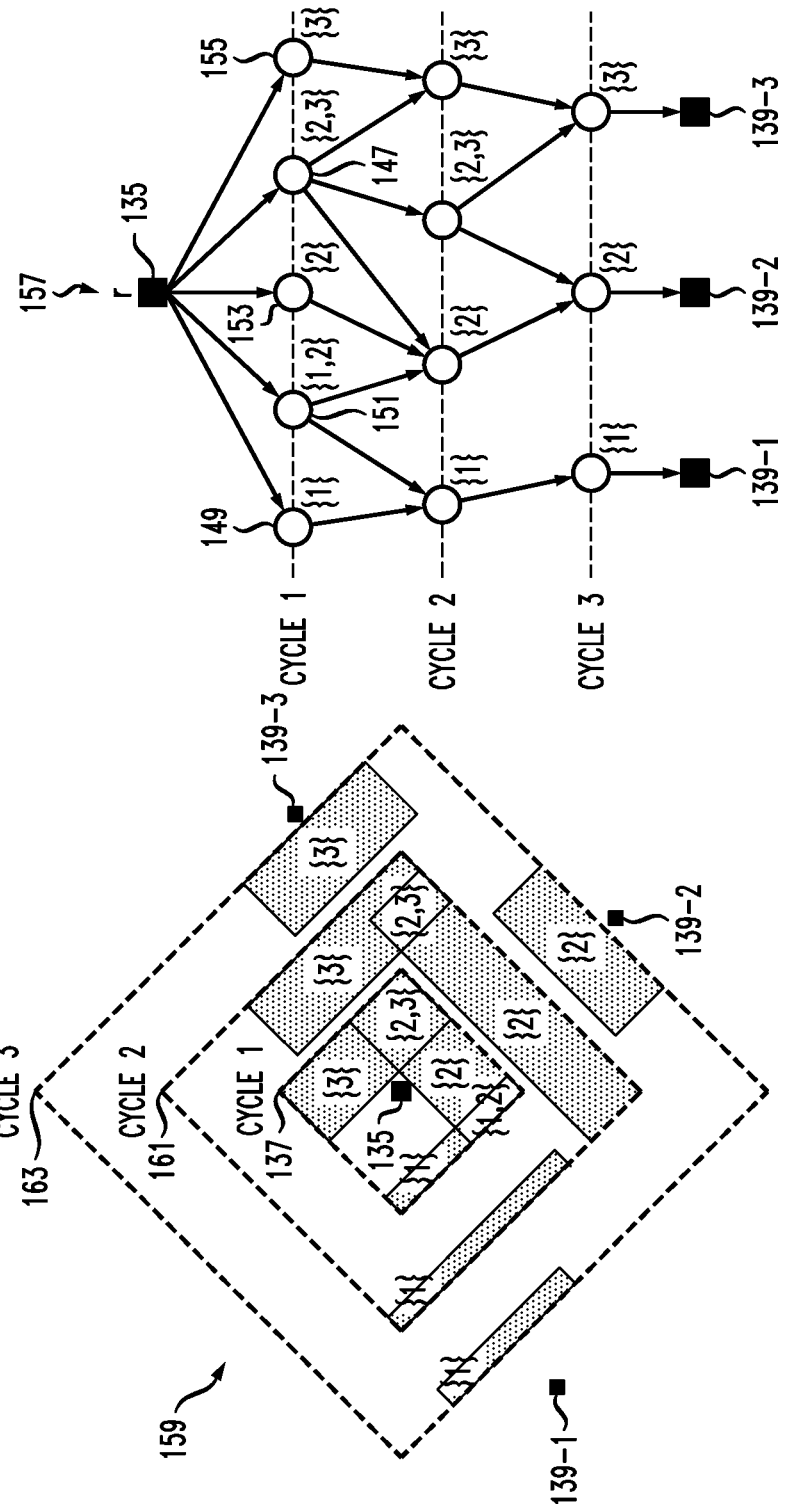
FIG. 6 illustrates a topology search graph, in accordance with one or more embodiments.

Refer now to FIG. 6, which illustrates topology search graph construction. On the right-hand side, note at 157 a complete graph of available options, with a diagram 159 on the left showing the corresponding "Manhattan Diamonds." Each node in graph 157 represents a specific placement region and cycle. The source is 135 and the first diamond 137 represents candidates for location of the latch for cycle 1. Each node in the data structure 157 on the right-hand side represents a latch and has a corresponding shaded area on the left-hand side diagram 159. For example, if the latch is placed in a certain location, it corresponds to a certain node and will eventually drive sinks 2 and 3, as indicated by the sink numbering within braces {2,3} at 147, whereas if the latch is placed in another certain location, it will only drive sink 3, as indicated by the sink numbering within braces {3} at 155. Similarly, if the latch is placed in still another certain location, it will only drive sink 2, as indicated by the sink numbering within braces {2} at 153, and so on. The second diamond 161 represents candidates for location of the latch for cycle 2, and the third diamond 163 represents candidates for location of the latch for cycle 3. Reference characters for the nodes in cycles 2 and 3 is omitted to avoid clutter, but a similar process can be employed. The in-brace numbering { } for the nodes in graph 157, for each given cycle, corresponds to the in-brace numbering { } for the shaded regions in the corresponding cycles in view 159.

Figure 7:
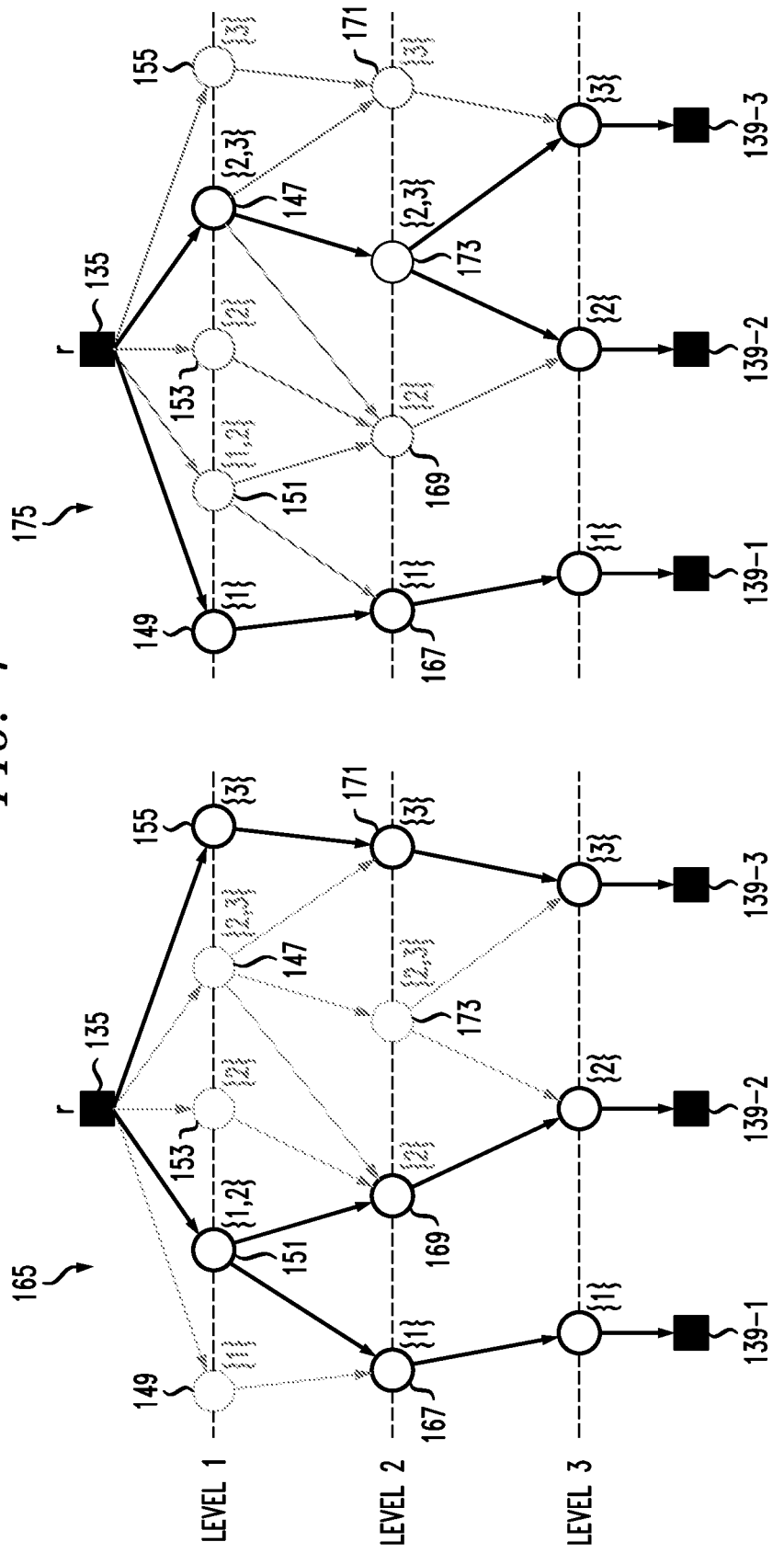
FIG. 7 illustrates latch tree creation, in accordance with one or more embodiments.

Now consider a third step, actual creation of the latch (latch tree creation). Refer now to FIG. 7; in particular, the left-hand side 165 thereof. In one aspect, simply select nodes (each representing a latch) in the topology search graph such that all the sinks are covered in each cycle/level, to generate the latch tree. The first selected node 151 covers sinks 1 and 2, and the second selected node 155 covers sink 3, such that all the sinks are covered. This completes level 1. Proceed to level 2. It should be verified that all the nodes selected at the previously level are covered properly here. In other words, latch 151 at level 1 is going to feed sinks 1 and 2. Thus, it is necessary to cover sinks 1 and 2 for this node at level 2 now. Since options are limited, select node 167 and node 169. At level 2, covering sinks 1 and 2 from latch 151 is now complete. It is still appropriate to cover sink 3 as well at level 2. Pick the last latch 171 from 155 and level 2 is complete; all three sinks are covered. Node 173 at level 2 is not used in example 165. Likewise, attend to level 3; once each sink 139-1, 139-2, 139-3 has been reached, a workable (but not necessarily optimal) tree has been built. Stated generally, at each level, cover all sinks of source nodes (selected at the previous level).

The right-hand side 175 of FIG. 7 depicts an alternative tree. At level 1, select nodes 149 {1} and 147 {2,3}. The right-hand tree 175 is more efficient since it uses one less latch. Both trees are fairly similar at level 1. However, at level 2, on the left-hand side 165, there was no longer an option to keep sinks 1 and 2 together, such that an extra latch was needed. On the right-hand side, however, sinks 2 and 3 can be kept together at level 2 as seen at node 173. Since the goal is to minimize the number of latches to be inserted, the right-hand tree 175 is preferred to the left-hand tree 165.

Figure 8:
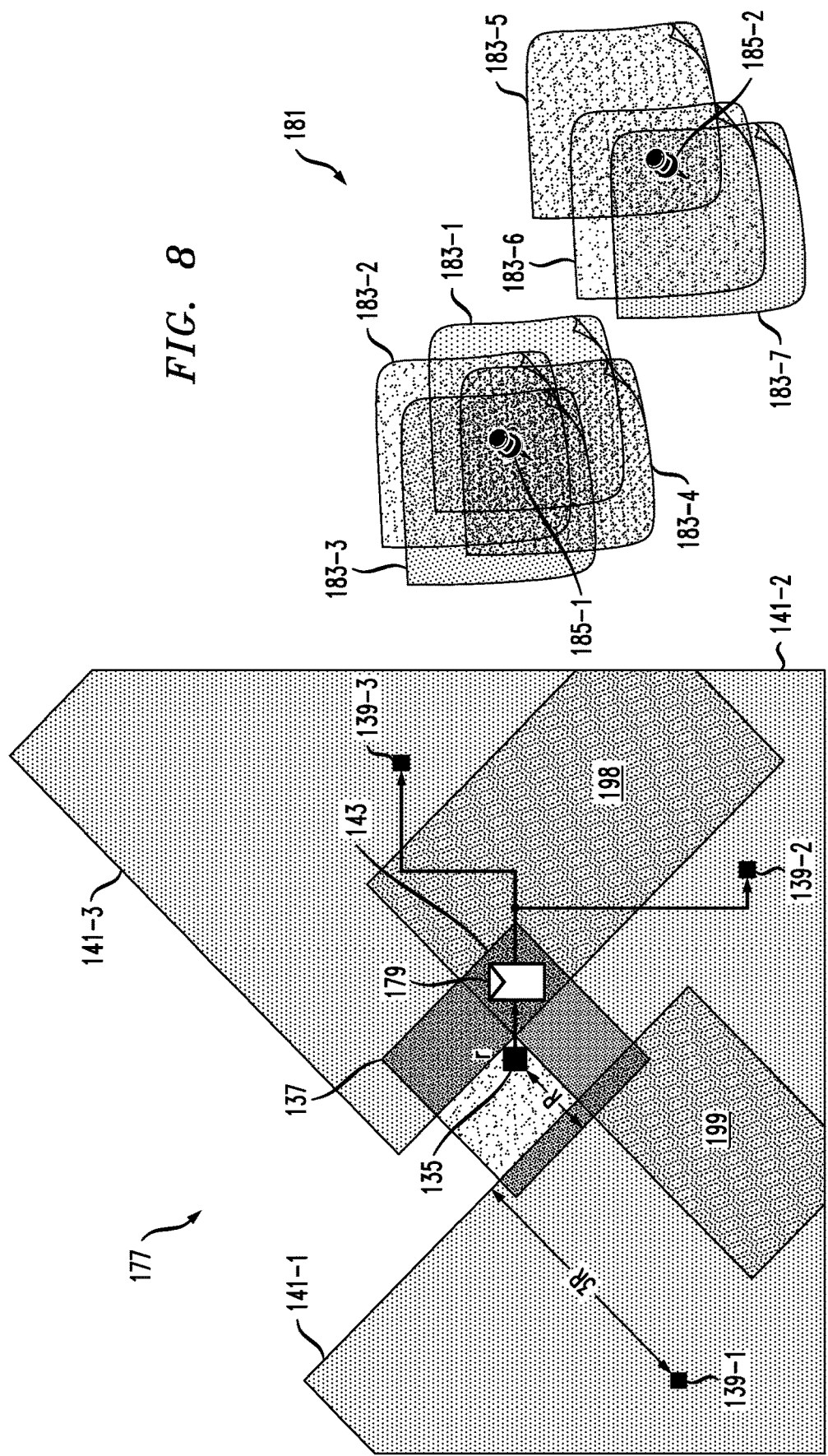

Referring now to FIG. 8, note that the above procedure requires solving exact cover problems at each cycle/level. An exact cover problem is an NP-complete problem which requires a large amount of computational resources and is likely be too slow for many practical applications. One or more embodiments accordingly employ a greedy heuristic to cover all sinks at each level. In this approach, at every level, start picking latches that cover the greatest number of sinks. The left-hand side of FIG. 8 shows an enlarged view 177 of a portion of view 133 in FIG. 5 wherein a latch 179 is picked to cover the greatest number of sinks. The significance of regions 198, 199 is discussed below. As seen in the right-hand view 181 of FIG. 8, an analogy can be made to "sticky notes." The Manhattan diamond for each source and sink at each level is represented by a sticky note 183-1 through 183-7, and an attempt is made to determine the minimum number of thumbtacks 185-1, 185-2 needed to hold all of the sticky notes together.

FIG. 9 shows an exemplary greedy heuristic, including a flow chart 187 and a reproduction of view 175 from FIG. 7 for illustrative convenience. In one or more embodiments, at every level, carry out the following process. Consider cycle 1. The first node 149 can cover one sink; the second node 151 can cover two sinks, and so on. One or more embodiments sort and select the node or latch that covers the greatest number of sinks, in each cycle. In the example of FIG. 9, there are two candidates; i.e., two nodes which each cover two sinks; namely 151 and 147. In one or more embodiments, ties are broken by determining which candidate has a larger overlap area, since for such a candidate is more likely that nodes can also be kept together at the next level, so as to save additional latches. Referring back again to FIG. 8, compare the 2, 3 overlap area 198 to the 1, 2 overlap area 199 and note that the former is significantly larger than the latter. This is why 2,3 is selected over 1,2 at the first level. Turning back to the flow chart 187 of FIG. 9, continue iteratively until every sink is covered, and continue at each level. In particular, after beginning at 189, in step 191, pick the node that covers the most sinks, using the node with the larger area coverage to break ties. In step 193, remove nodes having sinks covered by the selected node. In decision block 195, determine whether every sink is covered. If not, as per the NO branch, return to step 191. If all sinks are covered, as per the YES branch, that level/cycle is done as indicated at 197; proceed to the next level/cycle until complete.

Advantageously, in one or more embodiments, integrated circuits designed using aspects of the invention are more power efficient and/or area efficient, and/or have higher performance than those not designed using aspects of the invention. The use of the topology search graph with the min cover method is believed to be particularly advantageous in one or more embodiments. Cycle reach analysis is also helpful in one or more embodiments. Various greedy heuristics are known (e.g. largest size first), but heretofore have not been used in conjunction with a topology search graph. Given the teachings herein, the skilled artisan will be able to select a suitable greedy heuristic. Note that a greedy heuristic does not necessarily need to be employed in every instance; for example, an exact solution could be used for small problems where it is not computationally infeasible, and a greedy heuristic could be used for larger problems where an exact solution is not computationally feasible. In one or more embodiments, the greedy heuristic in combination with the generation of a topology search graph, so that the min cover method can be applied, improves the speed/performance of the computer running the EDA software.

Figure 13:
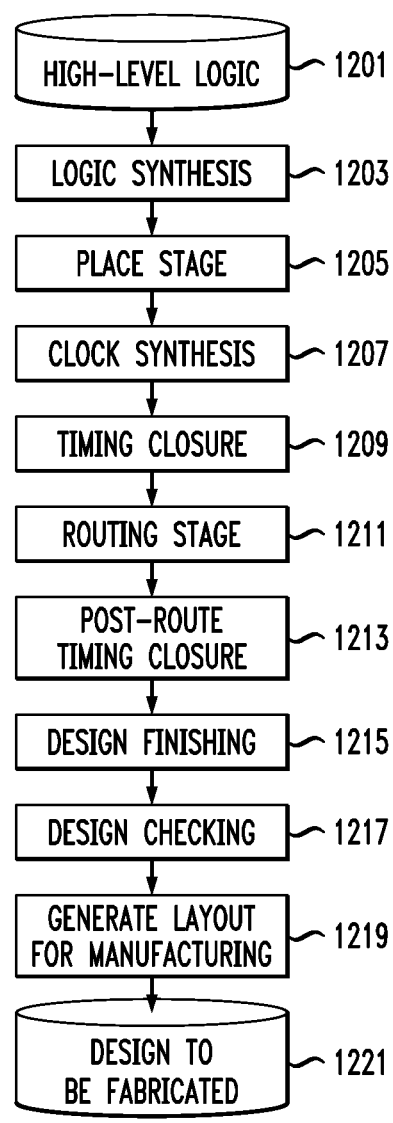
FIG. 13 shows an exemplary high-level Electronic Design Automation (EDA) tool flow, within which aspects of the invention can be employed.

One or more embodiments are used in the construction phase of EDA which also involves placement. One or more embodiments should be carried out prior to clock optimization: implement the signals, come up with the latches, place them, and then carry out clock optimization, wherein the positions of the latches are finalized—in essence, an "early construction" phase. One or more embodiments are implemented early in the placement stage and before routing. In one or more embodiments, in order to build the graph, there should be some placement of the source and the sink—thus, one or more embodiments are preferably implemented in the middle of the placement process. Refer to FIG. 13, discussed in detail below, showing, inter alia, logic synthesis 1203, placement stage 1205, clock synthesis 1207, timing closure 1209, and routing 1211.

Note that one or more embodiments can advantageously be used in two ways: to build latch tree from scratch with designer specifications, and/or, if a tree has already been built, embodiments can be used to improve the existing tree. For example, in one experiment, it was possible to redesign an existing tree to reduce the number of latches from sixteen to nine.

One or more embodiments permit building power- and/or timing-efficient multi-cycle latch trees which has heretofore been challenging and time consuming. One or more embodiments advantageously automate this task and improve productivity, allowing for the achievement of power/area/timing optimization goals while using the minimal number of latches. One or more embodiments achieve the desired goal(s) while nevertheless generating legal placement, complying with target timing closure, and in a congestion-aware manner.

One or more embodiments also permit design space exploration, allowing the variation of layer traits and/or rebuilding of existing full and/or partial latch trees. One or more embodiments provide the opportunity to rebuild latch trees that may have been developed over several design generations.

One or more embodiments thus enhance the physical design of multi-cycle wires.

Consider an exemplary multi cycle synthesis high-level flow. Given the root net name, latch type, and layer trait(s), "rip out" latches from an existing logic-free multi-cycle tree. Annotate the sinks with cycle requirements. Select a feasible layer trait. Build a skeleton latch tree and assign layers. Generate latch locations. Invoke latch location optimization methods to improve timing quality of results (QOR).

Pertinent latch tree metrics include (i) total number of latches used, (ii) timing points considered for evaluation, and (iii) timing metrics computed for points considered. Regarding (i), one or more embodiments seek to reuse existing latches. The reused latch may drive a different set of sinks. Latches can be "cloned" if appropriate—a new tree may need more latches in some cases. Regarding (ii), timing points considered for evaluation can include, for example, internal latch input/outputs and sink pins with cycle requirements. Some embodiments ignore sink pins fed directly by the root net. Regarding (iii), appropriate timing metrics computed for points considered include:

Slacks>slack_threshold (typically 5 ps) considered closed
    Worst slack in the tree
    Number of critical sinks (not fed directly by root net)
    Timing FOM (Figure of Merit)

One or more embodiments advantageously build a multi-cycle latch tree, involving multiple latches, from scratch, to meet specified constraints, and/or improve existing such trees. In either case, the latch tree can be feasibly implemented in actual hardware. One or more embodiments handle both leader-follower latch structures and flip-flops, for example.

Given the discussion thus far, it will be appreciated that an exemplary method for increasing the efficiency of electronic design automation, according to an aspect of the invention, includes obtaining an input specification including locations, in a putative integrated circuit design, for a source (e.g. 135) and a plurality of sinks (e.g. 139-1, 139-2, 139-3), including a plurality of source-sink pairs (e.g. 135/139-1, 135/139-2, 135/139-3). The sinks are located such that a required signal cannot propagate from the source in a single clock cycle. The sinks each have a required sink cycle delay (e.g. three) requiring latching. Of course, there may be other source-sink pairs in the integrated circuit that do not require latching. It is worth noting that the source propagates the same signal to each sink, but in general, the signal may reach the sinks at different times. The input specification also includes a set of layer traits for interconnect layers available in the putative integrated circuit design.

A further step includes selecting, from the set of layer traits, for each of the source-sink pairs, a corresponding one of the interconnect layers having a reach length which permits propagation of the required signal within the required sink cycle delay. Refer to FIG. 2 and accompanying text.

A further step includes generating a topology search graph as per FIGS. 3-6 and accompanying text. For example, for a first clock cycle (Cycle 1) of the required sink cycle delay, locate a movable region for a first latch 117-1 as a first plurality of overlapped regions one reach length from the source 135 and the required sink cycle delay number of reach lengths (e.g. three) from each one of the sinks 139-1, 139-2, 139-3. Also, for the first clock cycle, represent the first plurality of overlapped regions as nodes 149, 151, 153, 147, 155 on a first cycle level of a topology search graph 145, 157.

Furthermore, for a second clock cycle of the required sink cycle delay, locate a movable region for a second latch as a second plurality of overlapped regions two reach lengths from the source and the required sink cycle delay number of reach lengths, less one (e.g. three minus one=two), from each one of the sinks. Refer to Cycle 2 labeled 161 in FIG. 6. Also, for the second clock cycle, represent the second plurality of overlapped regions as nodes 167, 169, 173, 171 (see FIG. 7) on a second cycle level (Cycle 2) of the topology search graph 145, 157. This process (locating and representing steps) can be repeated for one or more additional clock cycles and cycle levels as needed.

An even further step includes creating a latch tree, based on the topology search graph, wherein one or more of the nodes are selected at each of the cycle levels, a required number of the latches is minimized, and at each of the cycle levels, all given ones of the plurality of sinks of those of the nodes selected at a previous level (i.e. source nodes at that level) are covered (at the first level, the source node at the previous level is simply the source r 135). Refer to FIGS. 7-9 and accompanying text. Furthermore in this regard, as discussed elsewhere herein, in one or more embodiments, at the first level, carry out the Manhattan Diamond overlap and determine candidate latches. Suppose, by way of example, there are ten total sinks, seven of which need three cycles. Suppose a first level latch drives five sinks, all of which need three cycles. For the next (Second) level, the problem has been reduced to a smaller problem with five sinks, all of which need three cycles, but since one cycle has already been implemented, only two cycles remain to be implemented. This new problem is independent of the rest of the tree, except for the constraint that objects cannot overlap. Stated in an alternative manner, once a latch is located at level one, its fanout becomes a new, smaller problem similar to the original problem. This aspect can be further illustrated by referring back to FIG. 7. As noted, all sinks of source nodes selected at a previous level are covered. In FIG. 7, at level two, on the left-hand side 165 the source nodes selected at the previous level (level one) are 151 and 155, while on the right-hand side 175 the source nodes selected at the previous level (level one) are 149 and 147. On the left-hand side 165, for example, there is a high-level problem viewed from the source r 135 and then a smaller problem viewed from the selected node 151. Since the sinks associated with node 151 are {1,2}, those sinks {1,2} (139-1 and 139-2) must be covered at level two. Similarly, there is another smaller problem viewed from node 155, and since the sink associated with node 155 is {3}, that sink {3} (139-3) must be also covered at level two. Thus, out of the high-level problem viewed from source r 135, two smaller problems viewed from nodes 151 and 155 have been created.

In one or more embodiments, the selecting includes selecting, for the corresponding one of the interconnect layers having the reach length which permits propagation of the required signal within the required sink cycle delay, a lowest-level one of the interconnect layers which permits the propagation of the required signal within the required sink cycle delay.

As noted, the latch tree can be created based on an exact solution (e.g., for smaller problems) or based on a greedy heuristic which, for each of the cycles, selects a given one of the nodes covering a greatest number of the sinks (e.g., for larger problems).

As also noted, ties between two given ones of the nodes covering a same number of the sinks can be broken, for example, by picking one of the two given ones of the nodes that covers a larger area. Refer back again to the FIG. 8 comparison of the 2, 3 overlap area 198 to the 1, 2 overlap area 199 and note that the former is significantly larger than the latter.

In one or more embodiments, the step of selecting, from the set of layer traits, for each of the source-sink pairs, the corresponding one of the interconnect layers having the reach length which permits the propagation of the required signal within the required sink cycle delay includes determining a shortest feasible reach as a maximum, over all of the source-sink pairs, of a source-sink distance divided by a corresponding required sink cycle delay. The reach length which permits the propagation of the required signal within the required sink cycle delay is greater than the shortest feasible reach. See FIG. 2 and accompanying text.

One or more embodiments include updating the putative integrated circuit design to reflect the created latch tree; and fabricating a physical integrated circuit in accordance with the updated putative integrated circuit design. For example, referring to FIGS. 11-13 discussed elsewhere herein, render the updated putative circuit design in a design language; and prepare a layout based on the updated putative circuit design rendered in the design language. Instantiate the layout as a design structure. The physical integrated circuit is then fabricated in accordance with the design structure.

Accordingly, in one or more embodiments, the layout is instantiated as a design structure. See discussion of FIG. 11. A physical integrated circuit is then fabricated in accordance with the design structure. See again discussion of FIG. 11. Refer also to FIG. 12. Once the physical design data is obtained, based, in part, on the analytical processes described herein, an integrated circuit designed in accordance therewith can be fabricated according to known processes that are generally described with reference to FIG. 12. Generally, a wafer with multiple copies of the final design is fabricated and cut (i.e., diced) such that each die is one copy of the integrated circuit. At block 410, the processes include fabricating masks for lithography based on the finalized physical layout. At block 420, fabricating the wafer includes using the masks to perform photolithography and etching. Once the wafer is diced, testing and sorting each die is performed at 430 to filter out any faulty die.

Figure 10:
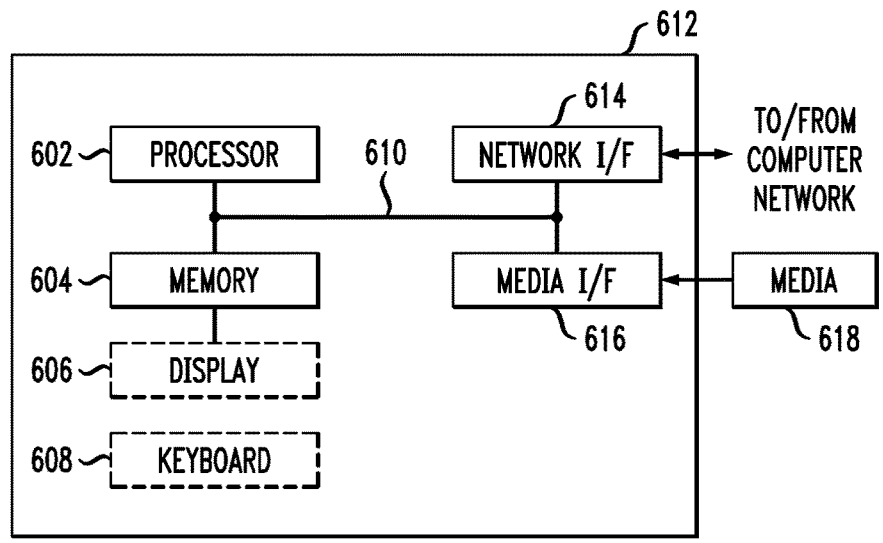
FIG. 10 depicts a computer system that may be useful in implementing one or more aspects and/or elements of the invention.

One or more embodiments include a computer including a memory 28; and at least one processor 16, coupled to the memory, and operative to carry out or otherwise facilitate any one, some, or all of the method steps described herein (as depicted in FIG. 10). In one or more embodiments, the performance (speed) of this computer is improved, for example, by automating the latch tree synthesis to reduce the time expended in circuit design. Furthermore in this regard, one or more embodiments will improve the productivity of the circuit designer. Currently, designers are typically performing aspects of latch tree synthesis by hand; i.e., they will run computer simulations multiple times under manual selection and control of the input parameters (trial and error). One or more embodiments automate aspects of latch tree synthesis resulting in less design time and better latch trees. Accordingly, the amount of computer resources/CPU time needed during the design cycle, as well as the amount of human design engineer hours, can be reduced using aspects of the invention. Furthermore, we have noted that the automated techniques disclosed herein provide better timing results than the trial-and-error approach. This speeds up the timing closure process (step 1209 discussed elsewhere herein). As will be appreciated by the skilled artisan, there are requirements wherein a signal has to leave a certain latch and arrive at a destination latch in time; if the signal does not arrive in time, so-called "negative slack" exists. In contrast, positive or zero slack means timing is closed (acceptable). We have found that in at least some cases, latch trees designed using aspects set forth herein have fewer instances of negative slack and thus speed up the timing closure process, further reducing CPU and human design engineer time.

Figure 11:
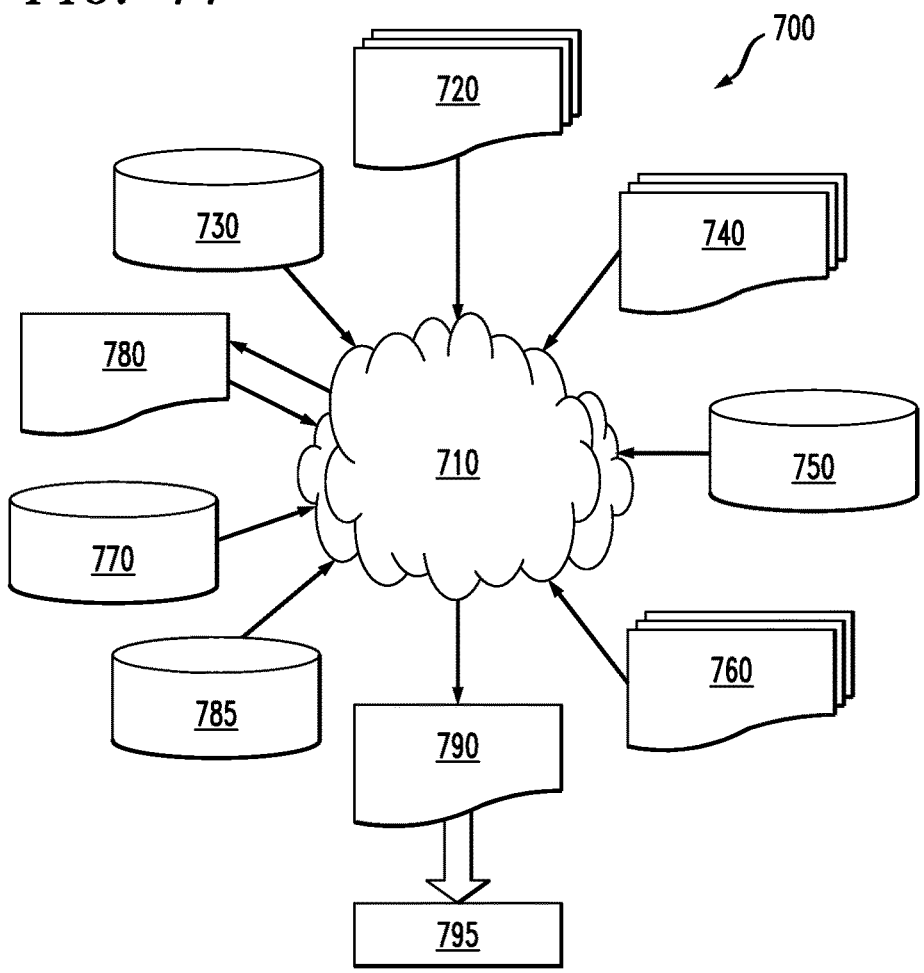
FIG. 11 is a flow diagram of a design process used in semiconductor design, manufacture, and/or test.
Figure 12:
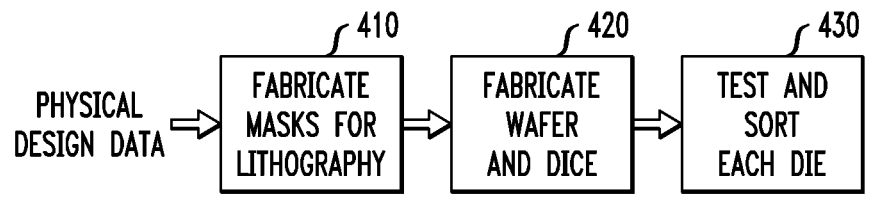
FIG. 12 shows further aspects of IC fabrication from physical design data.

Furthermore, referring to FIG. 11, in one or more embodiments the at least one processor is operative to generate a design structure for the integrated circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of increasing the power efficiency and/or timing efficiency of multi-cycle latch trees in the IC, by reducing the required number of latches, thereby enhancing the performance of integrated circuits using the latch trees) compared to circuits designed using prior art techniques. In general, one or more embodiments may use fewer latches and save power/area, or may build a better tree and improve timing, or both.

FIG. 13 depicts an example high-level Electronic Design Automation (EDA) tool flow, which is responsible for creating an optimized microprocessor (or other IC) design to be manufactured. A designer could start with a high-level logic description 1201 of the circuit (e.g. VHDL or Verilog). The logic synthesis tool 1203 compiles the logic, and optimizes it without any sense of its physical representation, and with estimated timing information. The placement tool 1205 takes the logical description and places each component, looking to minimize congestion in each area of the design. The clock synthesis tool 1207 optimizes the clock tree network by cloning/balancing/buffering the latches or registers. The timing closure step 1209 performs a number of optimizations on the design, including buffering, wire tuning, and circuit repowering; its goal is to produce a design which is routable, without timing violations, and without excess power consumption. The routing stage 1211 takes the placed/optimized design, and determines how to create wires to connect all of the components, without causing manufacturing violations. Post-route timing closure 1213 performs another set of optimizations to resolve any violations that are remaining after the routing. Design finishing 1215 then adds extra metal shapes to the netlist, to conform with manufacturing requirements. The checking steps 1217 analyze whether the design is violating any requirements such as manufacturing, timing, power, electromigration (e.g., using techniques disclosed herein) or noise. When the design is clean, the final step 1219 is to generate a layout for the design, representing all the shapes to be fabricated in the design to be fabricated 1221.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 11 shows a block diagram of an exemplary design flow 700 used for example, in semiconductor IC logic design, simulation, test, layout, and manufacture. Design flow 700 includes processes, machines and/ or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved latch tree synthesis can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing the efficiency of electronic design automation, the method comprising:
    obtaining an input specification comprising:
        locations, in a putative integrated circuit design, for a source and a plurality of sinks, comprising a plurality of source-sink pairs, wherein said sinks are located such that a required signal cannot propagate from said source in a single clock cycle, said sinks each having a required sink cycle delay requiring latching; and
        a set of layer traits for interconnect layers available in said putative integrated circuit design;
    selecting, from said set of layer traits, for each of said source-sink pairs, a corresponding one of said interconnect layers having a reach length which permits propagation of said required signal within said required sink cycle delay;
    for a first clock cycle of said required sink cycle delay, locating a movable region for a first latch as a first plurality of overlapped regions one reach length from said source and said required sink cycle delay number of reach lengths from each one of said sinks;
    for said first clock cycle, representing said first plurality of overlapped regions as nodes on a first cycle level of a topology search graph;
    for a second clock cycle of said required sink cycle delay, locating a movable region for a second latch as a second plurality of overlapped regions two reach lengths from said source and said required sink cycle delay number of reach lengths, less one, from each one of said sinks;
    for said second clock cycle, representing said second plurality of overlapped regions as nodes on a second cycle level of said topology search graph; and
    creating a latch tree, based on said topology search graph, wherein one or more of said nodes are selected at each of said cycle levels, a required number of said latches is minimized, and at each of said cycle levels, all given ones of said plurality of sinks of those of said nodes selected at a previous level are covered.

2. The method of claim 1, wherein said selecting comprises selecting, for said corresponding one of said interconnect layers having said reach length which permits propagation of said required signal within said required sink cycle delay, a lowest-level one of said interconnect layers which permits said propagation of said required signal within said required sink cycle delay.

3. The method of claim 2, wherein said latch tree is created based on an exact solution.

4. The method of claim 2, wherein said latch tree is created based on a greedy heuristic which, for each of said cycles, selects a given one of said nodes covering a greatest number of said sinks.

5. The method of claim 4, further comprising breaking ties between two given ones of said nodes covering a same number of said sinks by picking one of said two given ones of said nodes that covers a larger area.

6. The method of claim 5, wherein said step of selecting, from said set of layer traits, for each of said source-sink pairs, said corresponding one of said interconnect layers having said reach length which permits said propagation of said required signal within said required sink cycle delay comprises determining a shortest feasible reach as a maximum, over all of said source-sink pairs, of a source-sink distance divided by a corresponding required sink cycle delay, wherein said reach length which permits said propagation of said required signal within said required sink cycle delay is greater than said shortest feasible reach.

7. The method of claim 1, further comprising:
    updating said putative integrated circuit design to reflect said created latch tree; and
        fabricating a physical integrated circuit in accordance with said updated putative integrated circuit design.

8. The method of claim 7, further comprising:
    rendering said updated putative circuit design in a design language; and
    preparing a layout based on said updated putative circuit design rendered in said design language; and
    instantiating said layout as a design structure;
    wherein said physical integrated circuit is fabricated in accordance with said design structure.

9. The method of claim 1, further comprising repeating said locating and representing steps for one or more additional clock cycles and cycle levels.

10. A computer comprising:
    a memory; and
    at least one processor, coupled to said memory, and operative to:
        obtain an input specification comprising:
            locations, in a putative integrated circuit design, for a source and a plurality of sinks, comprising a plurality of source-sink pairs, wherein said sinks are located such that a required signal cannot propagate from said source in a single clock cycle, said sinks each having a required sink cycle delay requiring latching; and
            a set of layer traits for interconnect layers available in said putative integrated circuit design;
        select, from said set of layer traits, for each of said source-sink pairs, a corresponding one of said interconnect layers having a reach length which permits propagation of said required signal within said required sink cycle delay;
        for a first clock cycle of said required sink cycle delay, locate a movable region for a first latch as a first plurality of overlapped regions one reach length from said source and said required sink cycle delay number of reach lengths from each one of said sinks;
        for said first clock cycle, represent said first plurality of overlapped regions as nodes on a first cycle level of a topology search graph;

for a second clock cycle of said required sink cycle delay, locate a movable region for a second latch as a second plurality of overlapped regions two reach lengths from said source and said required sink cycle delay number of reach lengths, less one, from each one of said sinks;

for said second clock cycle, represent said second plurality of overlapped regions as nodes on a second cycle level of said topology search graph; and create a latch tree, based on said topology search graph, wherein one or more of said nodes are selected at each of said cycle levels, a required number of said latches is minimized, and at each of said cycle levels, all given ones of said plurality of sinks of those of said nodes selected at a previous level are covered.

11. The computer of claim 10, wherein said at least one processor is operative to select, for said corresponding one of said interconnect layers having said reach length which permits propagation of said required signal within said required sink cycle delay, a lowest-level one of said interconnect layers which permits said propagation of said required signal within said required sink cycle delay.

12. The computer of claim 11, wherein said latch tree is created based on an exact solution.

13. The computer of claim 11, wherein said latch tree is created based on a greedy heuristic which, for each of said cycles, selects a given one of said nodes covering a greatest number of said sinks.

14. The computer of claim 13, wherein said at least one processor is further operative to break ties between two given ones of said nodes covering a same number of said sinks by picking one of said two given ones of said nodes that covers a larger area.

15. The computer of claim 14, wherein said at least one processor is operative to select, from said set of layer traits, for each of said source-sink pairs, said corresponding one of said interconnect layers having said reach length which permits said propagation of said required signal within said required sink cycle delay, by determining a shortest feasible reach as a maximum, over all of said source-sink pairs, of a source-sink distance divided by a corresponding required sink cycle delay, wherein said reach length which permits said propagation of said required signal within said required sink cycle delay is greater than said shortest feasible reach.

16. The computer of claim 10, wherein said at least one processor is further operative to:
update said putative integrated circuit design to reflect said created latch tree;
render said updated putative circuit design in a design language;
prepare a layout based on said updated putative circuit design rendered in said design language; and
instantiate said layout as a design structure.

17. The computer of claim 16, wherein said at least one processor is further operative to:
provide said design structure to fabrication equipment to facilitate fabrication of a physical integrated circuit in accordance with said design structure.

18. The computer of claim 10, wherein said at least one processor is further operative to repeat said locating and representing for one or more additional clock cycles and cycle levels.

19. A non-transitory computer readable medium comprising computer executable instructions which when executed by a computer performing electronic design automation cause the computer to perform a method which increases the efficiency of the electronic design automation, the method comprising:
obtaining an input specification comprising:
locations, in a putative integrated circuit design, for a source and a plurality of sinks, comprising a plurality of source-sink pairs, wherein said sinks are located such that a required signal cannot propagate from said source in a single clock cycle, said sinks each having a required sink cycle delay requiring latching; and
a set of layer traits for interconnect layers available in said putative integrated circuit design;
selecting, from said set of layer traits, for each of said source-sink pairs, a corresponding one of said interconnect layers having a reach length which permits propagation of said required signal within said required sink cycle delay;
for a first clock cycle of said required sink cycle delay, locating a movable region for a first latch as a first plurality of overlapped regions one reach length from said source and said required sink cycle delay number of reach lengths from each one of said sinks;
for said first clock cycle, representing said first plurality of overlapped regions as nodes on a first cycle level of a topology search graph;
for a second clock cycle of said required sink cycle delay, locating a movable region for a second latch as a second plurality of overlapped regions two reach lengths from said source and said required sink cycle delay number of reach lengths, less one, from each one of said sinks;
for said second clock cycle, representing said second plurality of overlapped regions as nodes on a second cycle level of said topology search graph; and
creating a latch tree, based on said topology search graph, wherein one or more of said nodes are selected at each of said cycle levels, a required number of said latches is minimized, and at each of said cycle levels, all given ones of said plurality of sinks of those of said nodes selected at a previous level are covered.

20. The non-transitory computer readable medium of claim 19, wherein said selecting comprises selecting, for said corresponding one of said interconnect layers having said reach length which permits propagation of said required signal within said required sink cycle delay, a lowest-level one of said interconnect layers which permits said propagation of said required signal within said required sink cycle delay.

* * * * *